Aug. 4, 1953
A. MARVEL
2,647,398
BALANCE TESTING DEVICE
Filed April 2, 1952
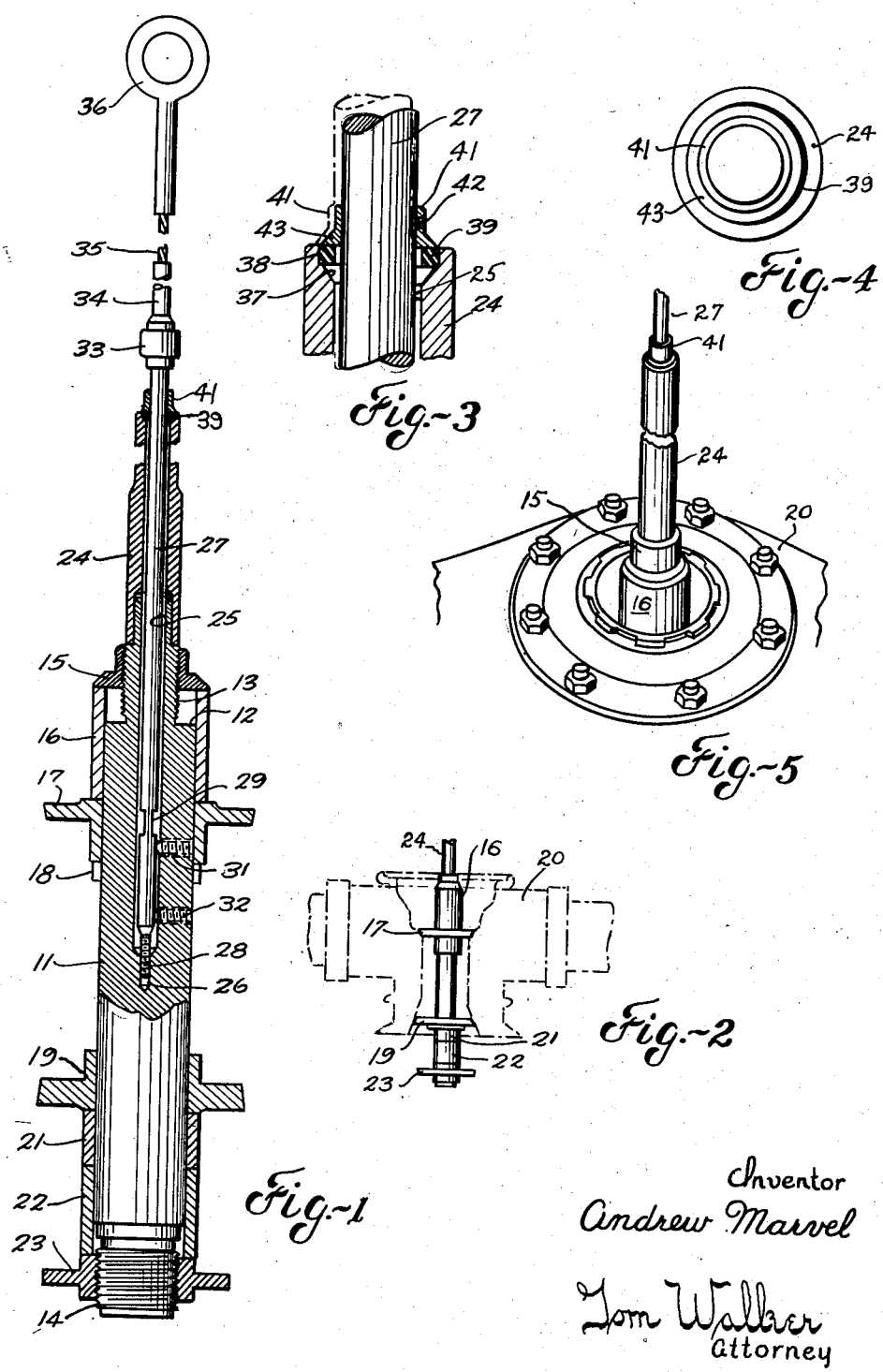
Inventor
Andrew Marvel
Tom Walker
Attorney Patented Aug. 4, 1953

2,647,398

UNITED STATES PATENT OFFICE 2,647,398

BALANCE TESTING DEVICE

Andrew Marvel, Caldwell, N. J.

Application April 2, 1952, Serial No. 280,068

10 Claims. (Cl. 73—66)

This invention relates to static balancing devices, and particularly to a suspension type balancer for revoluble bodies adapted to automatically indicate the degree of unbalance and the relative location of the area of excessive weight.

The invention has special reference to relatively small, light weight and portable balancers, devices for example as disclosed in the patent to Sutton No. 2,481,256, issued September 6, 1949. As such it is useful in the shop and in the field in the balancing of a variety of articles as airplane propellers, wheels, fans and like devices wherein the condition of balance is more or less critical.

The object of the invention is to simplify the construction as well as the means and method of manufacture of balance testing devices, whereby such devices may not only be economically manufactured, but will be more efficient and satisfactory in use, adaptable to a wide variety of applications and have a relatively long, useful life.

A further object of the instant invention is to utilize a solid suspension rod within the device, a weakened, necked down section thereof providing a point of flexure about which the rod may tilt under out of balance conditions.

Another object of the invention is to utilize in combination with the solid suspension rod a flexible suspension element, absorbing excessive tilting influences in the system.

A further object of the invention is to provide for dampening of oscillations of the suspension rod due to air currents, and other causes unconnected with the balance of the article supported.

Still another object of the invention is to provide for accurate initial positioning of the suspension rod in a manner obviating a highly precise machining of the parts.

A further object of the invention is to provide a balance tester possessing the advantageous structural features, the inherent meritorious characteristics and the method of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is shown the preferred but obviously not necessarily the only form of embodiment of the invention, Fig. 1 is a longitudinal sectional view of an assembled balancing device in which the present invention is embodied;

Fig. 2 is a detail view illustrating the balancing device in supporting relation to an airplane propeller;

Fig. 3 is an enlarged detail view of the balance indicating portion of the unit;

Fig. 4 is a detail plan view of the upper end of the balancing unit shaft and indicator disc disposed to indicate a degree of unbalance;

Fig. 5 is a perspective view of the hub portion of a conventional airplane propeller suspended upon a balancing device of the instant type.

Like parts are indicated by similar characters of reference throughout the several views.

Referring to the drawing, a static balancing device in accordance with the illustrative embodiment of the invention includes a body or shaft 11, the upper end of which is reduced in diameter to define an external shoulder 12. Immediately above the shoulder 12 the shaft 11 has a threaded formation 13 and there is a similar formation 14 on the lower end of the shaft. A nut 15 is installed on the formation 13 and engages one end of a spacer sleeve 16 which has a sliding fit on the large diameter portion of the shaft. The other end of the sleeve 16 engages an adapter disc 17 also having a sliding fit on the shaft 11 and in concentric relation to the longitudinal axis of the shaft. The disc 17 rests on an adjustable locking or retaining ring 18.

Also concentrically mounted on the shaft 11, and in longitudinally spaced apart opposed relation to the disc 17, is another adapter disc 19. The latter rests on spacer sleeves 21 and 22 which in turn are supported on a nut 23 screwed onto the threaded formation 14.

The discs 17 and 19 may be formed and shaped for one or a plurality of applications. In the present instance, as indicated in Fig. 2, they are constructed and arranged to engage concentric sloping formations in the hub of an aircraft propeller 20. They may, however, be varied in accordance with the size and contour of the body to be balanced and the size of central opening therein in which the balancing unit is to be received. It will be understood that the parts achieve the interengaging, cooperative relation of Fig. 2 by first removing one adapter disc assembly, as for example the assembly 19—23, inserting the shaft 11 through the hub of the propeller and then remounting the disc assembly on the shaft. By adjustment of the nuts 15 and 23 the discs are drawn up tightly upon their respective complementary surfaces in the bore of the hub, it being further possible by adjustment of these nuts to raise or lower the entire propeller along the shaft 11, thus vertically shifting the center of gravity of the propeller relative to the shaft.

The extreme outer end of the shaft is further reduced in diameter to be received in the counterbored inner end of a shaft extension member 24. The shaft 11, and extension 24 thereof, have registering axial bores which for present purposes may be considered as a single bore 25. At its one end the bore 25 opens through the outer end of the extension 24, and at its other end terminates within the shaft 11. At the bottom thereof is a tapped recess 26. Extending into the bore 25 is an arbor or spindle 27 having at its inner end a threaded projection 28 screwed into the recess 26 and so anchoring the spindle with respect to the shaft 11. In diameter, the spindle 27 is slightly smaller than the bore 25, and it is formed, near its inner end, with a cut-out or weakened section 29. Under applied stresses, therefore, the spindle 27 may flex about the section 29, tilting relatively to the shaft 11, within the confines of the bore 25.

The spindle 27 is constructed and arranged to normally occupy a concentric position in the bore 25. It tends to be so positioned by reason of its anchorage in recess 26 but is precisely adjusted to and held in a concentric condition by two sets of radial set screws 31 and 32. These are located in longitudinally spaced apart sets of radial openings in the shaft 11 and engage the spindle 27 between its inner end and the weakened section 29.

The spindle 27 extends through and beyond the open outer end of bore 25, and, at its outer end, is operatively connected to a coupling 33. The coupling presents an axial stem 34, to which a flexible cable 35 is concentrically secured. The other end of the cable 35 is similarly secured to an eye fitting 36 which is adapted to engage a suitable overhead support and so freely suspend the balancer device and the article being balanced.

Near its upper end, the bore 25 terminates in a bevel portion 37 (Fig. 3) which in turn merges with a counterbore 38. Seated in the counterbore 38 is an insert member 39 which can be made of a plastic material and which is colored for visual contrast with an overlying bushing 41. The member 39 has a central opening registering with and equal in diameter to the bore 25. The bushing 41 closely fits the spindle 27 and is fastened to it, as by a set screw 42. A skirt 43 on the lower end of the bushing 41 is spaced a few thousandths of an inch above the end of shaft extension 24 and extends toward the outer periphery of the insert member 39. When the spindle 27 is concentric in the bore 25, the bushing 41 is concentric with respect to the insert 39. The insert then is wholly covered by the bushing or a truly annular strip thereof is exposed, depending upon the diameter of the skirt 43. In the event of flexing of the spindle relative to the shaft a lateral motion of the bushing 41 across the insert 39 takes place, resulting in the exposing of a crescent shaped area of the insert, as seen in Fig. 4. The observer accordingly has a visual indication of unbalance. It will be understood that spaced apart concentric lines on the insert 39 may be used to give a reading of the extent of unbalance, and it will of course further be understood that the direction of unbalance may be represented by a line drawn radially through the broadest part of the exposed crescent shaped area.

When the balancer device is suspended, with the article to be balanced engaged between the discs 17 and 19, the complete mass of the suspended body must be in balance else the spindle 27 will tilt by pivoting at the weakened, necked down section 29. Being the pivot point, and since the portion beneath section 29 is held rigid relative to the shaft 11, the section 29 may be considered the suspension point. The sensitivity of the device in detecting and indicating out of balance conditions may be varied by varying the longitudinal relation of the suspension point and the center of gravity of the article being balanced. Thus the suspension point must always be above the center of gravity to provide stability in the system. By causing such point to approach more closely to the center of gravity, however, increased sensitivity may be had. The length of the spindle 27, or distance between the section 29 and insert 39 is selected in accordance with the extent of desired amplification of motion at the pivot 29.

After a body to be balanced has been placed on the balancing device, a reading cannot be taken until all incidental motion and vibrations have stopped. Further, when the balancer is adjusted for high sensitivity the period of incidental movement is quite long, and the system is affected by drafts and other air disturbances. In order to impart increased steadiness to the system, and to reduce the time delay in arriving at a correct reading, the bore 25 is filled or substantially filled with a hydraulic medium, for example, oil. The oil, which will vary in viscosity according to the degree of dampening required, serves as a dampening agent, reducing both the extent and duration of oscillatory movements in the system.

All bending action in the spindle 27 takes place in the weakened section 29. The elastic limit of such section cannot be exceeded since the allowable motion permitted by the bore 25 is well within such limit. Excessive tilting influences are absorbed in the cable 35.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A static balance testing device for rotary bodies, including a shaft presenting an axial bore opening through one end thereof, mounting means on the exterior of said shaft for the body to be balanced, a solid relatively inflexible spindle member received in said bore and anchored at its inner ends to said shaft, said spindle having a diameter somewhat less than the diameter of said bore and projecting out of said bore beyond said shaft, suspension means engaged with the outer end of said spindle, and a reduced diameter necked portion on said spindle allowing a relative tilting motion between said shaft and said spindle in response to a condition of unbalance in the supported body.

2. A static balance testing device for rotary bodies, including a shaft providing a mount for said bodies and presenting an axial bore opening through one end thereof, a tapped axial recess in the bottom of said bore, a spindle of lesser diameter than said bore received therein and having an integral projection on its inner end screw threaded into said tapped recess, said spindle having a reduced diameter neck portion between its ends and having its outer end extending outside said bore, and a flexible suspension member attached to the outer end of said spindle.

3. A static balance testing device according to claim 2, characterized by radially adjustable means carried by said shaft for holding said spindle concentric in said bore, said means engaging said spindle between its inner end and the reduced diameter neck portion.

4. A static balance testing device for rotary bodies, including a shaft providing a mount for said bodies and presenting an axial bore opening through one end thereof, a solid spindle received in said bore with the inner end thereof anchored in said bore, said spindle having a reduced diameter necked portion for flexure thereof relative to the shaft and said spindle further extending outside said bore, and a flexible suspension member attached to the outer end of said spindle.

5. A static balance testing device according to claim 4, characterized in that said bore contains a liquid, dampening oscillatory flexing movements of said spindle.

6. A static balance testing device, including a shaft, longitudinally spaced apart relatively adjustable mounting members on said shaft, an axial bore in said shaft opening through one end thereof, a spindle having an inner end projecting into said bore and anchored therein and an outer end outside said shaft, the diameter of said spindle being less than that of said bore, a flexible suspension member attached to the outer end of said spindle, a reduced diameter portion formed in the part of said spindle received in said bore, said portion defining a point of flexure for said spindle relatively to said shaft, and a body of liquid contained in said bore and dampening oscillatory flexing movements of said spindle.

7. A static balance testing device for rotary bodies, including a shaft providing a mount for said bodies and presenting an axial bore opening through one end thereof, a tapped axial recess in the bottom of said bore, a spindle of lesser diameter than said bore received therein and having an integral projection on its inner end screw threaded into said tapped recess, said spindle having a reduced diameter neck portion between its ends defining a point of flexure for said spindle relative to said shaft, and a plurality of longitudinally spaced apart means engaging the spindle between its inner end and said point of flexure for holding the spindle concentric in said bore.

8. A static balance testing device according to claim 7, characterized in that said bore contains a liquid, dampening oscillatory flexing movements of said spindle.

9. A static balance testing device according to claim 7, characterized by supporting means on said shaft for the body to be balanced, said supporting means being adjustable to shift the center of gravity of such body nearer to or more distant from the said point of flexure of said spindle.

10. A static balance testing device for rotary bodies, including a shaft providing a mount for said bodies and presenting an axial bore opening through one end thereof, a spindle of lesser diameter than said bore received in said bore and having its inner end anchored therein, the distance between said spindle and the wall of said bore permitting a relatively small amount of tilting of the spindle with respect to the shaft, means defining a weakened section in said spindle about which such flexure of the spindle takes place, and a flexible suspension member attached to the outer end of said spindle absorbing flexing loads exceeding the limits of movement of the spindle in the bore.

ANDREW MARVEL.

References Cited in the file of this patent

UNITED STATES PATENTS

| Number | Name | Date |
| --- | --- | --- |
| 431,750 | DeLaval | July 8, 1890 |
| 1,389,728 | Akimoff | Sept. 6, 1921 |
| 1,776,525 | Talbot | Sept. 23, 1930 |
| 2,349,288 | Lannen | May 23, 1944 |
| 2,481,256 | Sutton | Sept. 6, 1949 |
| 2,512,231 | Hart | June 20, 1950 |
| 2,519,689 | Morrow | Aug. 22, 1950 |
| 2,569,311 | Hoare | Sept. 25, 1951 |